United States Patent [19]

Lapine

[11] 4,219,230
[45] Aug. 26, 1980

[54] VEHICLE BODY CONSTRUCTION

[75] Inventor: Anatole Lapine, Döffingen, Fed. Rep. of Germany

[73] Assignee: Dr. Ing. h.c. F. Porsche Aktiengesellschaft, Fed. Rep. of Germany

[21] Appl. No.: 859,706

[22] Filed: Dec. 12, 1977

[30] Foreign Application Priority Data

Dec. 10, 1976 [DE] Fed. Rep. of Germany ....... 2655990

[51] Int. Cl.² .............................................. B60J 9/02
[52] U.S. Cl. ................................................... 296/216
[58] Field of Search ............... 296/137 R, 146, 137 E, 296/137 B, 84 R, 84 D, 84 A, 137 B, 137 F, 137 G, 137 H; 52/397, 764, 398, 280, 281

[56] References Cited

U.S. PATENT DOCUMENTS

| 2,921,814 | 1/1960 | Mede | 296/137 R |
|---|---|---|---|
| 2,989,338 | 6/1961 | Hezler, Jr. | 52/764 X |
| 3,027,186 | 3/1962 | Chairipar | 296/137 R X |
| 3,228,156 | 1/1966 | Hitzelberger | 52/397 X |
| 3,400,971 | 9/1968 | Rentz | 296/84 R |
| 3,451,716 | 6/1969 | Clare et al. | 296/137 R |
| 3,788,681 | 1/1974 | Barenyi et al. | 296/84 R X |
| 3,866,373 | 2/1975 | Hudock | 52/781 X |
| 3,868,804 | 3/1975 | Tantlinger | 52/781 X |
| 3,974,753 | 8/1976 | Blomgren et al. | 296/137 R X |
| 3,981,113 | 9/1976 | Griffin | 52/397 X |
| 4,093,304 | 6/1978 | Ziegler | 296/84 D |

FOREIGN PATENT DOCUMENTS 317036  5/1929  United Kingdom ................ 296/137 B Primary Examiner—John J. Love
Assistant Examiner—Norman L. Stack
Attorney, Agent, or Firm—Craig & Antonelli

[57] ABSTRACT

A vehicle body construction which includes at least one vehicle frame member and at least one pane of glass with the at least one pane of glass being arranged so as to extend over the at least one frame member and cover at least a portion of an outside surface thereof. At least one adhesive member is provided for attaching the at least one pane of glass to the frame member. The pane of glass may be inked, shaded or colored at least in the area of the adhesive member so as to conceal the adhesive member from view.

9 Claims, 5 Drawing Figures

U.S. Patent   Aug. 26, 1980   Sheet 2 of 3   4,219,230
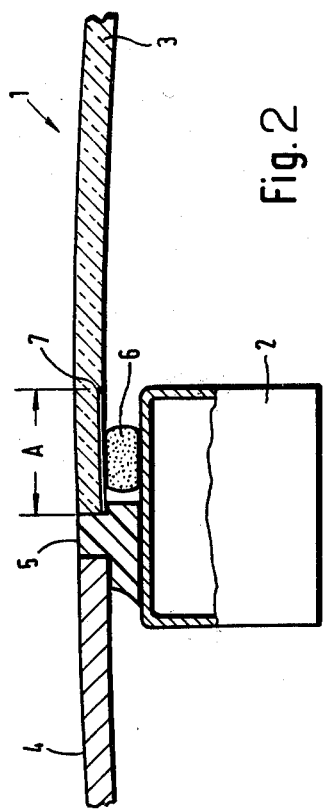
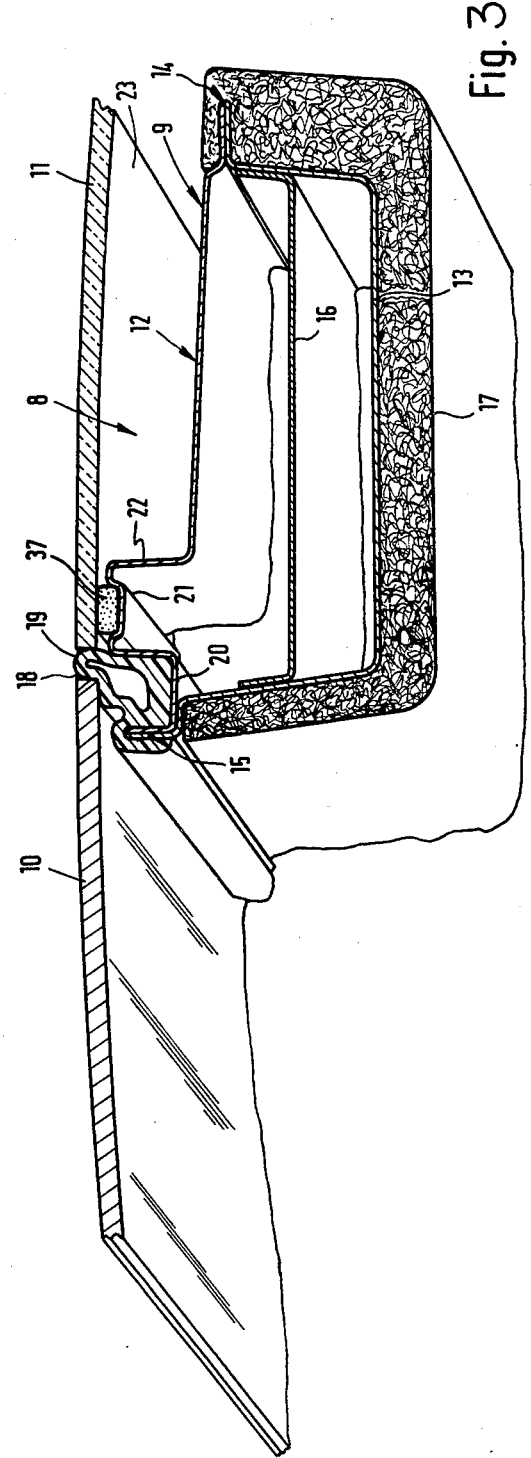

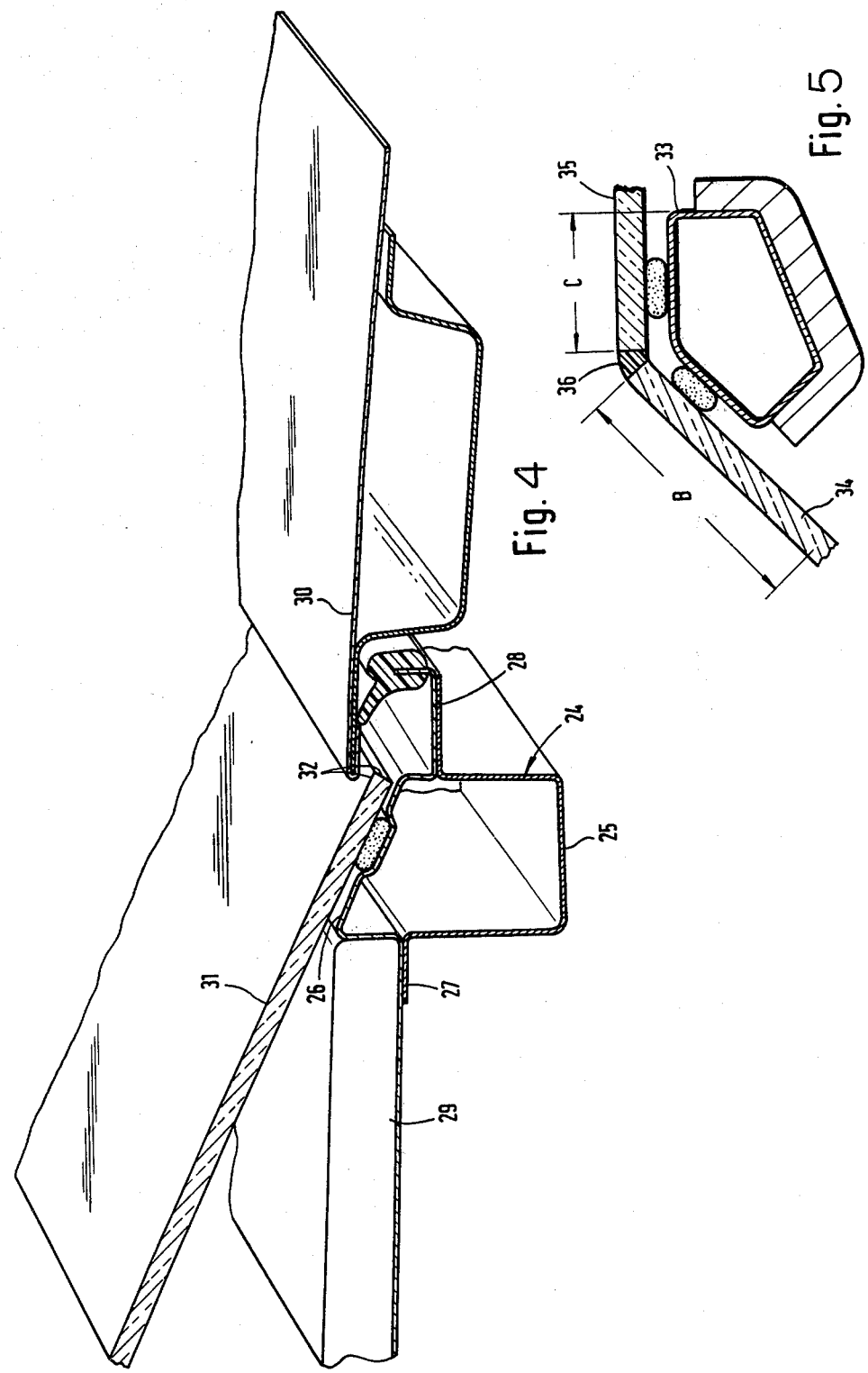

VEHICLE BODY CONSTRUCTION

The present invention relates to a body construction and, more particularly, to a motor vehicle body construction which includes window panes which are brought into contact with frame portions of the vehicle body.

In proposed vehicle body constructions of the aforementioned type, a steplike recess is provided at a frame portion of the body construction with the recess receiving or accommodating a window pane of the vehicle. With the window pane inserted into the recess of the frame, a visible joint is formed, which joint is normally covered by a molding or strip. One disadvantage of this proposed construction resides in the fact that the molding or strip projects over the plane of the window pane such that, during driving of the motor vehicle, air streams are trapped and deflected by the molding or strip so as to produce annoying air noises.

A further disadvantage of the proposed body constructions resides in the fact that, as compared with a recessless frame, the production of the steplike offset recess requires higher tool costs and special constructive measures in order to securely attach the window pane and the frame to adjoining vehicle body parts.

Moreover, another disadvantage of the proposed vehicle body constructions resides in the fact that considerable difficulties are encountered during a cleaning of the vehicle body, especially in the areas of the molding or strip and the recesses. This is particularly true at automatic car washes employing rotary brushes since the road dirt and grime collected on the parts of the molding or strip resting on the window pane cannot be removed by the rotating brushes.

The aim underlying the present invention essentially resides in providing a vehicle body construction, especially a motor vehicle body construction, wherein the attachment of the window panes to adjoining vehicle body parts is greatly facilitated.

According to one advantageous feature of the present invention, the window panes of the vehicle are arranged so as to cover an outside portion of adjoining vehicle frame members at least at alternate sections with the panes being attached at vehicle body parts such as, for example, the roof, the bonnet, door window or the like. By virtue of this arrangement, it is possible to mount window panes at the vehicle body parts without employing frames.

According to another advantageous feature of the present invention, the window panes are congruently attached to the associated vehicle body parts, that is, the window panes and the associated vehicle body parts are disposed in the same plane. By virtue of this construction, a more streamlined body construction results in the area of the attachment of the window panes to the associated vehicle body parts with no elements projecting therefrom trapping and deflecting air streams so as to produce annoying air noises.

It is also possible in accordance with the present invention, under certain constructive assumptions, to attach or connect the window panes at the vehicle body parts in a covered manner, with the respective window panes being fastened to the frame members of the vehicle by means of adhesive members. The frame members may be provided with recesses for accommodating the adhesive members and the window panes may be inked or otherwise colored or shaded at least in the area of the adhesive members so as to conceal the same. Preferably, the inking or shading is provided at the inside of the window pane.

In accordance with a further advantageous feature of the present invention, in a vehicle provided with a roll bar or frame member extending transversely of the vehicle, a windshield, and a removable roof extending between the roll bar or frame member and the windshield, the window pane may be arranged so as to overhang the roll bar or frame member and be attached to the roof under the formation of a joint with a sealing member being provided between the window pane and an edge of the removable roof.

In accordance with yet a further feature of the present invention, the roll bar or frame member is provided with a small support flange arranged at a predetermined distance from the window pane. By virtue of the provision of the support flange, a space is provided between the window pane and an upper surface of the roll bar or frame member so that access is permitted to the window surface in the area of the roll bar or frame member to permit cleaning of the same. Additionally, it is also possible to ink, color or shade the area of the window pane which overlies the roll bar or frame member so as to conceal the upper surface of the roll bar or frame member from view.

Accordingly, it is an object of the present invention to provide a vehicle body construction which avoids by simple means the shortcomings and disadvantages encountered in the prior art.

Another object of the present invention resides in providing a vehicle body construction wherein window panes are mounted so as to cover frame elements of the vehicle body at their outside, thereby eliminating the necessity of providing expensive recess constructions to receive the window panes.

A further object of the present invention resides in providing the vehicle body construction wherein a congruent connection or attachment of the window pane at the vehicle body members assures that no annoying wind noises are created.

An additional object of the present invention resides in providing a vehicle body construction wherein the areas of the connection between the window panes and vehicle body members may be cleaned in a simple manner.

These and other objects, features and advantages of the present invention will become more apparent from the following description when taken in connection with the accompanying drawings which show, for the purposes of illustration only, several embodiments in accordance with the present invention, and wherein:

FIG. 2 is a partial cross-sectional view taken substantially along a central longitudinal plane of FIG. 1;

FIG. 3 is a cross-sectional view taken along the line III—III of FIG. 1;

FIG. 4 is a cross-sectional view taken along the line IV—IV of FIG. 1; and

FIG. 5 is a partial cross-sectional view taken along the line V—V of FIG. 1.

Figure 1:
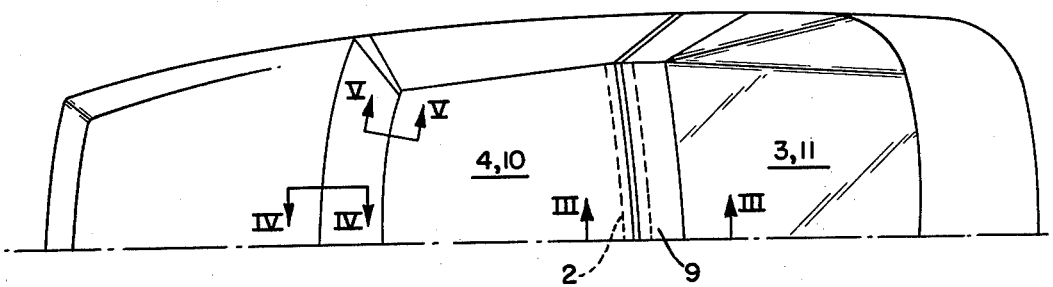
FIG. 1 is a top plan view of a roof construction in accordance with the present invention.

Referring now to the drawings wherein like reference numerals are used throughout the various views to designate like parts and, more particularly to FIGS. 1 and 2, according to these figures, a vehicle body generally designated by the reference numeral 1 is provided which includes a frame member 2, a pane 3 of glass, and a roof 4. The frame member 2 is formed, for example, from a commercially available tube member so as to have a rectangular cross-sectional configuration. The pane 3 of glass is arranged so as to cover the outside of the frame member 2 in an area A and is connected to the roof 4 by a sealing member 5. The connection between the pane 3 of glass and the roof 4 is congruent, that is, both the pane 3 of glass and the roof 4 are arranged in a common plane without a formation of any projections.

An adhesive member 6 is provided for holding the pane 3 of glass at the frame 2. The support area of the adhesive member 6 on the frame 2 is covered by an inking, shading or coloring 7 at the inside of the pane 3 of glass. The inking, coloring or shading 7 may be accomplished, in a known manner, by a screen pressure method.

As shown in FIG. 3, the interior of the vehicle may be provided with a free-standing frame construction generally designated by the reference numeral 8 which includes a roll bar or member generally designated by the reference numeral 9 and a removable roof element 10 preferably made of a synthetic material, with roof element extends between a windshield frame (not shown) and the roll bar or member 9. The removable roof member 10 would be provided in lieu of the stationary roof member 4 shown in FIG. 1. A pane 11 of glass, corresponding to the pane 3 of FIG. 1, is arranged so as to overhang or extend above an upper surface of the roll bar or member 9 and thereby cover the outer side of the roll bar or member 9. The pane 11, as with the pane 3, is congruently connected to the roof 10 so that both the pane 11 and roof 10 extend in a common plane.

The roll bar or member 9 is formed by an outer part 12 and an inner part 13 with the parts 12 and 13 being connected, by welding, cementing or the like, by flanges 14, 15. The inner part 13 is provided with a reinforcing member 16 and a suitable padding 17 or the like is arranged on a side of the inner part 13 facing the passenger compartment of the vehicle.

The pane 11 is mounted in a frameless manner with the roof 10 so as to form a joint 18 with a sealing member 19 being provided between the pane 11 and roof 10. The sealing member 19 is held in a U-shaped channel 20 of the roll bar or member 9. An adhesive member 37, for holding the window pane 11 at the vehicle roof 10, is arranged in a recess 21 of the roll bar or frame member 9. The outer part 12 of the roll bar or member 9 is recessed and defines a small support flange 22 for the adhesive member 37. By virtue of the recess of the outer part 12, a space 23 is provided between the inner surface of the pane 11 and the upper surface of the roll bar or frame 9. The space 23 permits a cleaning of the inner surface of the window pane 11 and also the upper surface of the roll bar or frame 9. It is also possible to ink, color or shade the area of the window pane 11 facing the upper surface of the roll bar or member 9 in the manner described hereinabove so as to cover such upper surface.

As readily apparent, the arrangement of FIG. 3 is also applicable to a horizontal section in the area of a vehicle door window. In such an arrangement, the element 10 designated as the roof could be a door window movable in a vertical direction, which window glides, during operation, on the sealing member 19.

As shown in FIG. 4, a frame member generally designated by the reference numeral 24 is provided which consists of two members 25, 26 which are secured to each other by way of flanges 27, 28 which may be welded, cemented or the like. An instrument panel 29 is mounted on the flange 27 with the flange 28 extending under an edge of a bonnet 30. A window pane 31 covers a portion of the frame 24 and is connected or joined at the bonnet in such a way that an end portion 32 of the pane 31 is covered by the edge of the bonnet 30.

As shown in FIG. 5, a windshield frame 33 is covered by a windshield pane 34 and by a roof portion 35 formed by a window pane with the pane 34 and roof portion 35 being arranged at an angle with respect to each other. An element 36 is arranged between the windshield pane 34 and the roof portion 35. The element 36 is of an elastic material and, possibly, of an elastic transparent material. The windshield pane 34 and the roof 35 may be inked, colored or shaded in the areas designated B, C.

While I have shown and described several embodiments in accordance with the present invention, it is to be understood that the same is not limited thereto, but is susceptible of numerous changes and modifications as are known to one of ordinary skill in the art to which it pertains, and I therefore do not wish to be restricted to the details shown and described herein, but intend to cover all such changes and modifications as are encompassed by the scope of the appended claims.

I claim:

1. A vehicle body construction which includes at least one vehicle body frame member and at least one fixed pane of glass, characterized in that the at least one pane of glass is arranged so as to extend over the at least one body frame member and cover at least a portion of an outside surface thereof, and in that frameless means are provided for attaching the at least one pane of glass to the frame member, said frameless means attaching said pane of glass in association with neighboring body parts with no elements projecting exteriorly therefrom, wherein the neighboring body parts include one of a stationary roof member and a removable roof member, the at least one pane of glass is attached to the frame member so as to be disposed in the same plane with the roof member, and said means for attaching the at least one pane of glass includes an adhesive member interposed between an inside surface of the pane of glass and an outside surface of the frame member, characterized in that the vehicle body construction further includes a roll bar member and a windshield frame member, both of which extend transversely of the vehicle body and are spaced from each other in a longitudinal direction of the vehicle, the removable roof member extends between the roll bar member and the windshield frame member, and in that the roll bar member constitutes the frame member with the pane of glass projecting over at least a portion of the roll bar member, the pane of glass and the removable roof member defining a joint between adjacent edges thereof, and in that a sealing member is provided in the joint between the pane of glass and the removable roof member.

2. A vehicle body construction according to claim 1, characterized in that the roll bar member includes an outer member having an outer surface facing the pane of glass, the outer member is recessed so as to define a space between an inside surface of the pane of glass and a portion of the outer surface of the outer member, and in that the outer member includes a support flange means for supporting the adhesive member.

3. A vehicle body construction according to claim 2, characterized in that a recess means is provided in the support flange means for accommodating the adhesive member.

4. A vehicle body construction according to claim 3, characterized in that a further recess means is provided in the outer member for accommodating the sealing member.

5. A vehicle body construction which includes at least one vehicle body frame member and at least one fixed pane of glass, characterized in that the at least one pane of glass is arranged so as to extend over the at least one body frame member and cover at least a portion of an outside surface thereof, and in that frameless means are provided for attaching the at least one pane of glass to the frame member, said frameless means attaching said pane of glass in association with neighboring body parts with no elements projecting exteriorly therefrom, wherein the neighboring body parts include a bonnet, and the pane of glass is a windshield, the frame member is arranged at the bonnet so that a lower edge of the windshield is covered by a portion of the bonnet, said means for attaching the at least one pane of glass includes an adhesive member interposed between an inside surface of the pane of glass and an outside surface of the frame member, characterized in that the vehicle body construction further includes a roll bar member and a windshield frame member spaced from the roll bar member, the windshield frame member being provided at an upper edge of the windshield and the roll bar member extending transversely of the vehicle body, a removable roof member is arranged between the windshield frame member and the roll bar member, a further pane of glass is provided and projects at least over a portion of the roll bar member, the further pane of glass and the removable roof member defining a joint between adjacent edges thereof, a sealing member is provided in the joint between the further pane of glass and the removable roof member, and a further adhesive member is interposed between an inside surface on the further pane of glass and an outside surface of the roll bar member.

6. A vehicle body construction according to claim 5, characterized in that the further pane of glass and the removable roof member are disposed in the same plane.

7. A vehicle body construction according to claim 6, characterized in that the roll bar member includes an outer member having an outer surface facing the further pane of glass, the outer member is recessed so as to define a space between an inside surface of the further pane of glass and a portion of the outer surface of the outer member, and in that the outer member includes a support flange means for supporting the further adhesive member.

8. A vehicle body construction according to claim 7, characterized in that a recess means is provided in the support flange means for accommodating the further adhesive member.

9. A vehicle body construction according to claim 8, characterized in that a further recess means is provided in the outer member for accommodating the sealing member.

* * * * *